United States Patent
Benninger

(10) Patent No.: US 7,944,962 B2
(45) Date of Patent: May 17, 2011

(54) METHOD AND APPARATUS FOR TRANSMISSION OF COMMAND COMBINATIONS BY MEANS OF CODED FREQUENCY-SHIFT KEYING

(75) Inventor: Hans Benninger, Turgi (CH)

(73) Assignee: ABB Technology AG, Zurich (CH)

( * ) Notice: Subject to any disclaimer, the term of this patent is extended or adjusted under 35 U.S.C. 154(b) by 1065 days.

(21) Appl. No.: 11/783,498

(22) Filed: Apr. 10, 2007

(65) Prior Publication Data

US 2007/0247324 A1    Oct. 25, 2007

(30) Foreign Application Priority Data

Apr. 10, 2006    (EP) .................................... 06405155

(51) Int. Cl.
*H04B 3/36*    (2006.01)
(52) U.S. Cl. ....................................... 375/211; 375/303
(58) Field of Classification Search .................. 375/211, 375/303, 305, 334
See application file for complete search history.

(56) References Cited

U.S. PATENT DOCUMENTS

| 4,079,355 A | 3/1978 | Van Der Gaag et al. |
| 6,466,832 B1 * | 10/2002 | Zuqert et al. ................... 700/94 |
| 6,708,044 B1 * | 3/2004 | Puknat et al. ............. 455/552.1 |
| 2006/0146919 A1 * | 7/2006 | Strittmatter .................. 375/211 |

FOREIGN PATENT DOCUMENTS

| DE | 41 38 175 A1 | 5/1993 |
| EP | 0 874 500 A2 | 10/1998 |
| GB | 1 284 999 A | 8/1972 |

OTHER PUBLICATIONS

European Search Report dated Sep. 7, 2006.

* cited by examiner

*Primary Examiner* — Emmanuel Bayard
(74) *Attorney, Agent, or Firm* — Buchanan Ingersoll & Rooney PC

(57) ABSTRACT

A method is disclosed for transmission of commands or command combinations via a communication link by coded frequency-shift keying. Each command or command combination is associated with one frequency pair. When a command changes from a preceding command or command combination to a subsequent command or command combination, one frequency (which will be the first to be transmitted) in the frequency pair of the subsequent command or command combination is chosen as a function of at least one other associated frequency pair.

20 Claims, 1 Drawing Sheet

METHOD AND APPARATUS FOR TRANSMISSION OF COMMAND COMBINATIONS BY MEANS OF CODED FREQUENCY-SHIFT KEYING

RELATED APPLICATION

This application claims priority under 35 U.S.C. §119 to European Patent Application No. 06405155.0 filed in Europe on Apr. 10, 2006, the entire content of which is hereby incorporated by reference in its entirety.

TECHNICAL FIELD

A method and an apparatus are disclosed for transmission of command combinations by coded frequency-shift keying. An exemplary method is disclosed for transmission of the commands or command combinations via a communication link by coded frequency-shift keying.

BACKGROUND INFORMATION

For protection of signal transmission by coded frequency-shift keying, two frequencies, for example $f_1$, $f_2$ are allocated to each command to be transmitted or to each command combination to be transmitted. The two frequencies are then transmitted for a specific time period T:

$\ldots, f_1, f_2, f_1, f_2, f_1, f_2, f_1, f_2, f_1$

A command change to be carried out from a command A, which is associated with the frequencies $f_1$, $f_2$, to a command combination A+B, which is associated with the frequencies $f_3$, $f_4$, can be done as follows:

$\ldots, f_1, f_2, f_1, f_2, f_3, f_4, f_3, f_4, \ldots$

If, for example, the frequencies $f_2$ and $f_3$ were now to be allocated to a command C, the command sequence would accordingly be A, C, A+B and not, as desired, A, A+B. This leads to errors, for example in the form of spurious initiations.

There are various variants or options for a command change for the command changes as described above.

A first variant or option for a command change is referred to as a single frequency change. In the case of a single frequency change, a first frequency $f_{1,BK1}$ or a second frequency $f_{2,BK1}$ in the preceding command combination $BK_1$ in the preceding command combination $BK_1$ matches a first frequency $f_{1,BK2}$ or a second frequency $f_{2,BK2}$ in the subsequent command combination $BK_2$. By way of example, the following frequency chain which represents a sequence of commands exhibits a single frequency change such as this from a preceding command combination $BK_1$ with a frequency pair ($f_1$, $f_2$) to a subsequent command combination $BK_2$ with a frequency pair ($f_2$,$f_3$):

$\ldots f_1, f_2, f_1, f_2, f_3, f_2, f_3, f_2, \ldots$

A single frequency change is applied analogously for a command B.

A second option is referred to as a double frequency change. In the case of a double frequency change, both the first frequency $f_{1,BK1}$ and the second frequency $f_{2,BK1}$ change to the subsequent command combination $BK_2$ when a command change takes place from the preceding command combination $BK_1$. This double frequency change can be carried out via an intermediate step. By way of example, the following frequency chain, which represents a sequence of commands, exhibits a double frequency change such as this from a preceding command combination $BK_1$ with a frequency pair ($f_1$,$f_2$) to a subsequent command combination $BK_2$ with a frequency pair ($f_3$,$f_4$) via an intermediate step ($f_2$,$f_3$):

$\ldots f_1, f_2, f_1, f_2, f_3, f_4, f_3, f_4, f_3, f_4, \ldots$

A double frequency change is applied analogously for a command B.

The change process described above could also be carried out via the frequency pairs ($f_1$,$f_3$); ($f_1$,$f_4$); ($f_2$,$f_4$). This means that four intermediate steps are possible on the basis of the combination for a double frequency change.

In order to maintain the correct command sequence, it would be possible not to allocate any command combinations to specific frequency pairs. In this specific example, this means that no command or command combination is allocated to the frequency pairs ($f_1$,$f_3$); ($f_1$,$f_4$); ($f_2$,$f_4$). However, this can be disadvantageous if, for example, there are a large number of commands, since the frequency range can then be very wide in order to cover the large number of different combinations.

Another solution art is to insert a pause between the individual command combinations. However, this can be disadvantageous because the total time for transmission of command combinations in consequence can rise considerably, and rapid transmission of command combinations is no longer guaranteed.

SUMMARY

A method and an apparatus are disclosed which can allow reliable and unambiguous transmission of commands or command combinations.

An exemplary method disclosed herein can be used for transmission of commands or command combinations via a communication link by coded frequency-shift keying. In an exemplary embodiment, a command or command combination is in each case associated with one frequency pair. In this case, when a command change takes place from a preceding command or command combination to a subsequent command or command combination, one frequency (which will be the first to be transmitted) in the frequency pair of the subsequent command or command combination is chosen as a function of at least one other associated frequency pair.

The choice of the first frequency to be transmitted can, for example, result in undesirable command combinations no longer occurring or being transmitted. Furthermore, the width of the frequency band can be chosen to be narrower since this narrow frequency band can be used more efficiently.

The first frequency to be transmitted can be chosen as a function of the frequency pair of the preceding command or command combination.

This can be advantageous because, for example, it can lead to the number of possible combinations being limited, since the choice is thus restricted to the first frequency to be transmitted.

By way of example, a command or command combination can be an independent protection command to be transmitted. This independent protection command can be transmitted by an electrical power line.

The frequencies of the command or of the command combination can be in a limited frequency band. The frequency band has an exemplary bandwidth of, for example, 4 kHz (or lesser or greater).

Furthermore, in an exemplary method disclosed herein, an insert frequency and/or a pause can be inserted on changing from the preceding command or command combination to the subsequent command or command combination.

The insertion of an insert frequency or of a pause can make it possible to increase the number of commands or command combinations to be transmitted, while the frequency band remains the same.

An apparatus is also disclosed for transmission of commands or command combinations via a communication link by coded frequency-shift keying. A computer program product is disclosed, having computer program code means for controlling the apparatus. An exemplary computer program product can include a data storage medium which contains the computer program code means.

BRIEF DESCRIPTION OF THE DRAWINGS

Exemplary embodiments will be described in more detail in the following text with reference to the drawings, in which.

DETAILED DESCRIPTION

Figure 1:
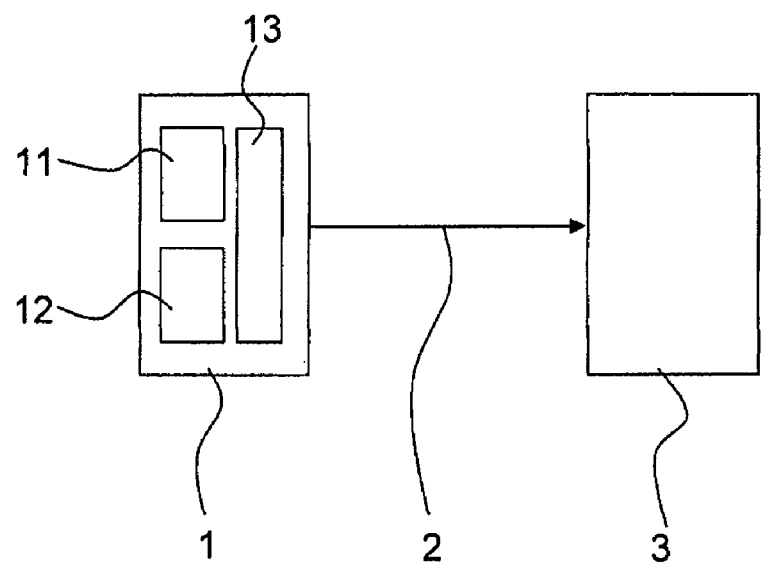
FIG. 1 shows a schematic illustration of an exemplary apparatus for transmission of commands or command combinations using a method as disclosed herein.

As illustrated schematically in FIG. 1, the exemplary apparatus 1 has a selection module 11, a command Table 12 and a communication module 13. The communication module 13 can be configured to transmit commands and/or command combinations by, for example, means of coded frequency-shift keying (FSK) via a communication line 2 to a receiving apparatus 3.

The communication module 13 can include a modem for communication via an electrical power line (PLC, Powerline Communications).

The selection module 11 can be formed as a programmed software module, which controls one or more processors for the apparatus 1, as will be described in the following text with reference to FIG. 2.

The command Table 12 comprises commands and/or command combinations, each of which has an associated frequency pair. The command Table 12 can be stored as a separate data table, or can be integrated in the selection module 11. Furthermore, the command Table 12 may also comprise a command change table.

A command B which is stored in the command Table 12 can be associated with a frequency pair which has a first frequency $f_{1,B}$ and a second frequency $f_{2,B}$. The first frequency $f_{1,B}$ and the second frequency $f_{2,B}$ have different period lengths. A command combination BK which is stored in the command Table 12 has an associated frequency pair which has a first frequency $f_{1,BK}$ and a second frequency $f_{2,BK}$. The expression "an associated frequency pair" accordingly means a frequency pair which represents one command or one command combination.

The expression "a command change" means a change from a preceding command $B_1$ to a subsequent command $B_2$ or from preceding command combinations $BK_1$ to subsequent command combinations $BK_2$. The expression "a command change" is also used to mean a change from a preceding command $B_1$ to a subsequent command combination $BK_2$ or from a preceding command combination $BK_1$ to a subsequent command $B_2$.

The commands B or command combinations BK to be transmitted may, for example, be subdivided into any number of categories; for example, three categories. The subdivision into categories can be used to define different commands B or command combinations BK.

For example, commands or command combinations in the first category are commands or command combinations for which the first frequency $f_{1,B2}$ or $f_{1,BK2}$ of a command or of a command combination is predetermined in a fixed manner for a specific command table, following a change in the command or the command combination.

Commands or command combinations in an exemplary second category are commands or command combinations for which a dependent frequency of the frequency pair is predetermined for a specific command table after a change from a preceding command $B_1$ or a preceding command combination $BK_1$ to a subsequent command $B_2$ or a subsequent command combination $BK_2$ as a function of the preceding command $B_1$ or the preceding command combination $BK_1$.

Commands or command combinations in an exemplary third category are commands for which the change from a preceding command combination to a subsequent command combination for a specific command table is made via an intermediate step. The intermediate step may be an insert frequency E or a pause P.

If sufficient individual frequencies are available, it is possible to find frequency associations so that all commands and command combinations fall in the first category. If frequencies are short, that is to say when a large number of different command combinations or commands have to be transmitted in a narrow frequency band, it may be desired to also allow commands and command combinations in the second category and in the third category. This is because use of these command combinations and/or commands can allow optimized use of the available frequencies.

Figure 2:
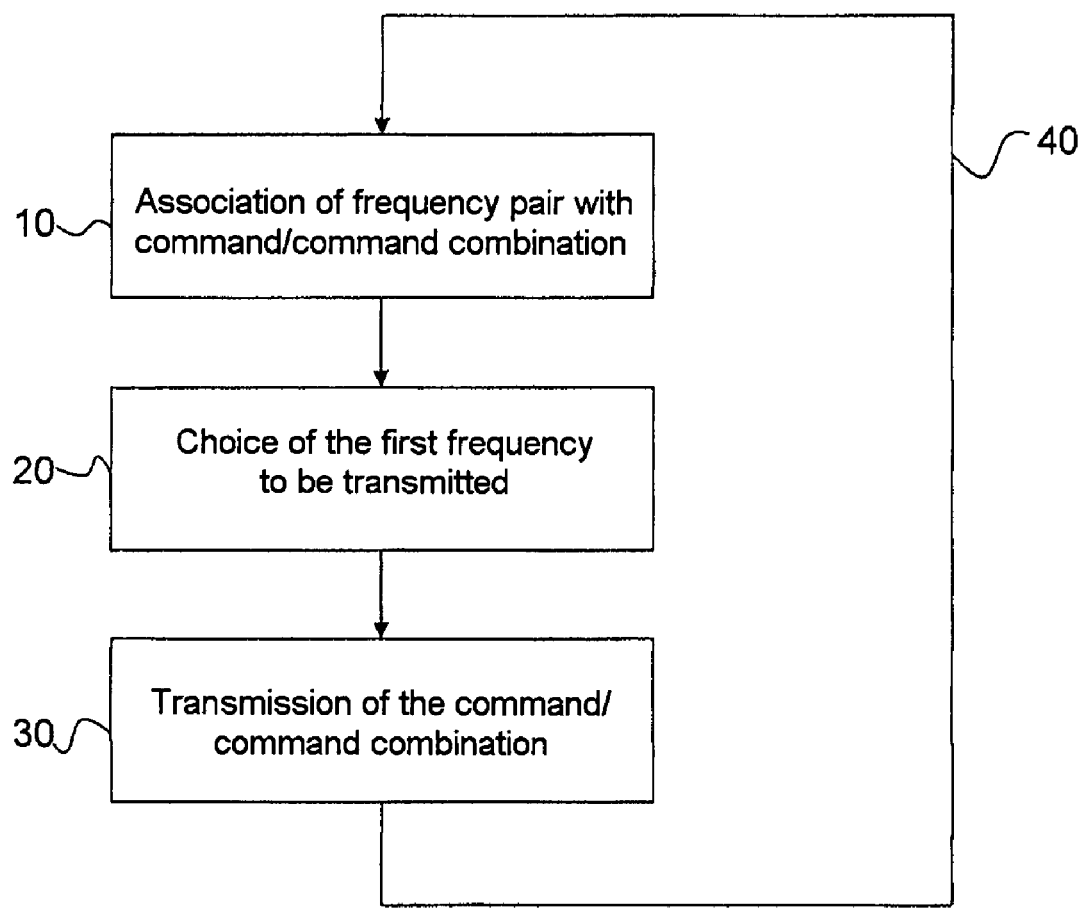
FIG. 2 shows a flowchart of an exemplary method disclosed herein.

As is illustrated in FIG. 2, the selection module 11 in an exemplary first method step 10 allocates one frequency pair to a command to be transmitted or to a command combination to be transmitted, with the assistance of the command Table 12.

A command Table 12 as described above may be configured, for example, as shown in Table 1. In this case, four commands A, B, C, D and possible command combinations which are stored in the command table are shown.

TABLE 1

|         | (f..., f6) | (f..., f5) | (f..., f4) | (f..., f3) | (f..., f2) |
|---------|------------|------------|------------|------------|------------|
| (f1, f...) | D         | C         | C + D     | B + C + D | B + C     |
| (f2, f...) | B         | A         | A + B     | A + B + C | ↵         |
| (f3, f...) | B + D     | A + C     | A + B + C + D | ↵     |           |
| (f4, f...) | A + B + D | A + C + D | ↵         |           |           |
| (f5, f...) | A + D     | ↵         |           |           |           |

According to Table 1, the frequency pair $(f_1, f_6)$ is allocated to the command D. According to Table 1, the frequency pair $(f_3, f_6)$ is allocated to the command combination B+D.

If now, for example, a preceding command A is transmitted and it is intended to transmit a subsequent command combination A+B, then this can be done by a single frequency change:

... $f_2, f_5, f_2, f_5, f_2, f_4, f_2, f_4, ...$ A→A+B

If, for example, a command A is then transmitted and it is intended to transmit a command combination A+B+D, this can be done by a double frequency change via the command combination A+D:

... $f_2, f_5, f_2, f_5, f_6, f_5, f_6, ...$ A→A+D

... $f_5, f_6, f_5, f_6, f_4, f_6, f_4, ...$ A+D→A+B+D

Table 2 shows a further example of a command Table 12 with three independent commands A, B, C and a test command T. In this example, the commands T, A, B, C each have a common frequency $f_5$.

TABLE 2

|  | (f..., f5) | (f..., f4) | (f..., f3) | (f..., f2) |
|---|---|---|---|---|
| (f1, f...) | T | — | — | A + B + C |
| (f2, f...) | A | A + C | A + B | ↵ |
| (f3, f...) | B | B + C | ↵ | |
| (f4, f...) | C | ↵ | | |

In an exemplary embodiment, eight different frequency combinations or frequency pairs are used to represent these three independent commands A, B, C and the test command T, as well as the command combinations A+C, A+B, B+C, A+B+C that result from the commands A, B, C.

As can be seen from Table 2, five single frequencies are sufficient to form ten different frequency pairs. The frequency pairs in Table 2 have been allocated such that all commands and command combinations with the exception of the command A are included in the first category. The frequency pairs ($f_1, f_4$ and $f_1, f_3$) have not been used in this case.

In a second method step 20, the first frequency to be transmitted is chosen with the assistance of the selection module 11.

In this case, the selection module 11 chooses the frequency which is intended to be the first to be transmitted for a command change from a preceding command $B_1$ to a subsequent command $B_2$. In this case, this first frequency to be transmitted is chosen as a function of at least one other associated frequency pair. This frequency which is the first to be transmitted can also be referred to as the frequency to be predetermined.

The same applies to the transmission of command combinations BK: in the case of a command change from a preceding command combination $BK_1$ to a subsequent command combination $BK_2$, a frequency which is the first to be transmitted in the frequency pair of the subsequent command combination $BK_2$ is chosen as a function of at least one other associated frequency pair by the selection module 11.

This also applies, of course, to a command change from a preceding command to a subsequent command combination or from a preceding command combination to a subsequent command.

The selection module 11 can choose the first frequency to be transmitted as a function of the frequency pair of the directly preceding command or command combination. In this case, the preceding command is the command which is transmitted immediately before the subsequent command.

In the case of a command sequence $B_1, B_2$ or $B_1, BK_2^*$ or $BK_1, BK_2$ or $BK_1, B_2$, this therefore means that a first frequency $f_{1,B2}$ or $f_{1,BK2}$ of the subsequent command $B_2$ or command combination $BK_2$ can be chosen as a function of the frequency pair of a preceding command $B_1$ or command combination $BK_1$. In particular, the first frequency $f_{2,B2}$ of the subsequent command $B_2$ or command combination $BK_2$ is dependent on the first frequency $f_{1,B1}$ or $f_{1,BK}$, and/or on the second frequency $f_{2,B2}$ or $f_{2,BK2}$ of the preceding command $B_1$ or command combination $BK_1$.

The selection module 11 can choose the first frequency to be transmitted as a function of the directly preceding command or command combination.

For example, the selection module 12 can be configured in such a manner that it can check a command change table contained in the command table. Table 3 is one example of a command change table such as this, which defines the choice of the first frequency to be transmitted. Table 3 shows the changes in the commands or command combinations defined in Table 2 for which there are restrictions. For these changes, the first frequencies to be transmitted can be identified by the frequency indexes that are underscored and printed in bold text.

TABLE 3

|  | A+B+C | B+C | A+C | A+B | T | C | B |
|---|---|---|---|---|---|---|---|
| A | 25 – 12 | | | | | | 25 – 15 |
| B | 35 – 12 | | | | | | |
| C | 45 – 12 | | | | | | |
| T | | | | | 15 – 24 | 15 – 23 | |
| A + B | | | | | | | |
| A + C | | | | | | | |
| B + C | | | | | | | |

Three examples of command changes are intended to describe in more detail the first frequency to be transmitted in the frequency pair of the subsequent command or command combination:

First Example (A→A+B+C):

A change from the command A ($f_2, f_5$) to the command combination A+B+C ($f_1, f_2$) is carried out as follows:

... $f_2, f_5, f_2, f_5, f_2, f_5, f_2, f_1, f_2, f_1, f_2$ ... A→A+B+C

In this case, the frequency $f_2$ is the first frequency to be transmitted in the frequency pair $f_1, f_2$ of the subsequent command combination A+B+C. This is because, if the frequency $f_1$ were to be the first to be transmitted after the frequency $f_5$, instead of the frequency $f_2$, the command T would be transmitted:

... $f_2, f_5, f_2, f_5, f_2, f_5, f_1$ ... A→T

Second Example (A→T):

This problem also occurs, of course, in the case of the desired command change from A ($f_2, f_5$) to T ($f_1, f_5$) and T ($f_1, f_5$) to A ($f_2, f_5$):

... $f_2, f_5, f_2, f_5, f_2, f_5, f_1, f_5, f_1, f_5$ ... A→T

In this case, the frequency $f_5$ is the first frequency to be transmitted in the frequency pair $f_1, f_5$ of the subsequent command T. This is because, if the frequency $f_1$ were to be transmitted instead of the frequency $f_5$, the command A+B+C would incorrectly be transmitted:

... $f_2, f_5, f_2, f_5, f_2, f_5, f_2, f_1$, ... A→A+B+C

Third Example (T→A+C):

The following frequencies are transmitted for a command change from T ($f_1, f_5$) to A+C ($f_2, f_4$):

... $f_1, f_5, f_1, f_5, f_4, f_2, f_4, f_2$ ... T→A+C

In this case, the first frequency to be transmitted is the frequency $f_4$. If other frequencies were to be transmitted during the change, then the following undesirable change could occur:

... $f_1, f_5, f_1, f_5, f_1, f_2, f_4, f_2$ ... T→A+B+C

As they are illustrated in the command change table, the first frequencies to be transmitted can be determined in various ways. For example, they can be determined on a control basis. It has been found to be particularly advantageous for a common frequency to occur in all of the commands in the association of the frequency pairs with the commands. By way of example, this is the frequency $f_5$ in Table 2, which occurs in all of the commands A, B, C, T. These frequencies determined in this way can then be stored in a command Table 12.

A further exemplary rule, which is not implemented completely in Table 2 because of the combination A+B+C, for good frequency associations states that the two frequencies used for T should occur only in those frequency pairs which are associated with single commands.

In the case of commands or command combinations in the first category, the first frequencies to be transmitted are determined statically. In this case, the first frequencies to be transmitted are determined before the method is carried out, for example during its implementation, that is to say during the definition of the command table. These statically determined first frequencies to be transmitted can be stored in the command change table.

In the case of commands or command combinations in the second category, the first frequencies to be transmitted can be determined dynamically as a function of the preceding command or command combination while the method is being carried out. Suitable algorithms or processing rules can be provided for this purpose. The corresponding algorithms or processing rules can be then processed by one or more processors.

In a third method step 30, the frequency pair which corresponds to the command or the command combination on the basis of the sequence defined in step 30 can be transmitted by means of the communication module 13.

A fourth method step 40 can be applied when a further command is intended to be transmitted. In this case, the method starts again with method step 10.

Four independent commands A, B, C, D plus a test command T require 16 frequency combinations. Command Table 4 illustrates one exemplary frequency allocation with 8 individual frequencies, in which case all of the commands and command combinations in category 1 can be allocated:

TABLE 4

|        | (f..., f8)   | (f..., F7)    | (f..., f6)    | (f..., f5)  | (f..., f4) | (f..., f3) | (f..., f2) |
|--------|--------------|---------------|---------------|-------------|------------|------------|------------|
| (f1, f...) | T        | —             | —             | —           | —          | —          | —          |
| (f2, f...) | A        | —             | —             | A + D       | A + C      | A + B      | ↵          |
| (f3, f...) | B        | —             | —             | B + D       | B + C      | ↵          |            |
| (f4, f...) | C        | B + C + D     | A + B + C     | —           | ↵          |            |            |
| (f5, f...) | D        | A + C + D     | A + B + D     | ↵           |            |            |            |
| (f6, f...) | —        | A + B + C + D | ↵             |             |            |            |            |
| (f7, f...) | C + D    | ↵             |               |             |            |            |            |

The frequencies to be predetermined, that is to say the first frequencies to be transmitted, can be summarized in Table 5 for all commands or command combinations for which there are restrictions for specific changes.

TABLE 5

| Command   | Frequency to be predetermined |
|-----------|-------------------------------|
| C         | f8                            |
| D         | f8                            |
| A + C     | f2                            |
| B + D     | f3                            |
| C + D     | f8                            |
| A + C + D | f5                            |
| B + C + D | f4                            |

The commands B or command combinations BK to be transmitted may be of very different types. In particular, however, the commands are independent protection commands for use in electrical power supply systems. In this case, the commands are transmitted via communication channels. If the commands or command combinations are used for protection of devices in the electrical power supply system, an electrical power line is used as a communication channel for transmission of the protection commands.

The commands B or the command combinations BK can be, for example, in a limited frequency band. This can allow an effective and efficient configuration of the appropriate apparatuses. The frequency band has an exemplary bandwidth of 4 kHz, or lesser or greater.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An apparatus for transmission of commands or command combinations via a communication link by coded frequency-shift keying, comprising:
   means for changing a preceding command or command combination associated with a first frequency pair to a subsequent command or command combination associated with a second frequency pair, and for choosing the frequency which will be first transmitted in the second frequency pair of the subsequent command or command combination as a function of at least one other associated frequency pair.

2. The apparatus as claimed in claim 1, wherein each command or the command combination is a protection command that is transmitted over an electrical power line.

3. The apparatus as claimed in claim 1, wherein the frequencies of each command or of each command combination are in a limited frequency band.

4. The apparatus as claimed in claim 3, wherein the limited frequency band has a bandwidth of 4 kHz.

5. The apparatus as claimed in claim 1, comprising:
   means for inserting an insert frequency and/or a pause on changing from the preceding command or command combination to the subsequent command or command combination.

6. The apparatus as claimed in claim 1, configured to choose the first frequency to be transmitted as a function of the first frequency pair of the preceding command or command combination.

7. The apparatus as claimed in claim 6, wherein each command or the command combination is a protection command that is transmitted over an electrical power line.

8. The apparatus as claimed in claim 6, wherein the frequencies of each command or of each command combination are in a limited frequency band.

9. The apparatus as claimed in claim 8, wherein the limited frequency band has a bandwidth of 4 kHz.

10. The apparatus as claimed in claim 6, comprising:
inserting an insert frequency and/or a pause on changing from the preceding command or command combination to the subsequent command or command combination.

11. A computer program product comprising computer program code means for implementing the computer readable steps of:
controlling one or more processors of an apparatus for transmission of commands or command combinations via a communication link by coded frequency-shift keying, each command or a command combination is associated with a frequency pair, in such a manner that the apparatus chooses, when a preceding command or command combination changes to a subsequent command or command combination, the first frequency to be transmitted in the frequency pair of the subsequent command or command combination as a function of at least one other associated frequency pair.

12. The computer program product as claimed in claim 11, wherein the computer program code means implements the computer readable step of controlling the processors in such a manner that the apparatus chooses the said first frequency to be transmitted as a function of the frequency pair of the preceding command or command combination.

13. The computer program product as claimed in claim 11, wherein each command or the command combination is a protection command that is transmitted over an electrical power line.

14. The computer program product as claimed in claim 11, wherein the frequencies of each command or of each command combination are in a limited frequency band.

15. The computer program product as claimed in claim 14, wherein the limited frequency band has a bandwidth of 4 kHz.

16. The computer program product as claimed in claim 11, comprising:
inserting an insert frequency and/or a pause on changing from the preceding command or command combination to the subsequent command or command combination.

17. The computer program product as claimed in claim 12, wherein each command or the command combination is a protection command that is transmitted over an electrical power line.

18. The computer program product as claimed in claim 12, wherein the frequencies of each command or of each command combination are in a limited frequency band.

19. The computer program product as claimed in claim 18, wherein the limited frequency band has a bandwidth of 4 kHz.

20. The computer program product as claimed in claim 12, comprising:
inserting an insert frequency and/or a pause on changing from the preceding command or command combination to the subsequent command or command combination.

* * * * *